United States Patent

[11] 3,530,896

[72] Inventor Marvin E. Whiteman, Jr.,
10010 Shoshone Ave., Northridge,
California 91324
[21] Appl. No. 724,135
[22] Filed April 25, 1968
[45] Patented Sept. 29, 1970

[54] HYDRAULIC POWER ACTUATOR AND PILOT VALVE UNIT ASSEMBLY
15 Claims, 3 Drawing Figs.

[52] U.S. Cl. .................................................. 137/625.66,
137/625.68, 137/625.69, 251/282
[51] Int. Cl. ............................................... F16k 11/07,
F16k 39/04
[50] Field of Search ............................................. 251/282;
137/596.12, 596.13, 625.66, 625.67, 625.68,
625.69

[56] References Cited
UNITED STATES PATENTS
2,294,702 9/1942 Van Der Werff ............. 251/282X
2,363,235 11/1944 Ellinwood .................... 137/596.12X
3,229,721 1/1966 Bingel .......................... 137/625.69

FOREIGN PATENTS
318,959 1/1957 Switzerland ............... 137/596.12

Primary Examiner—Henry T. Klinksiek
Attorney—Whann and McManigal

ABSTRACT: Fluid powered actuator means in which a cylinder reciprocably contains a piston connected to a power delivery element and being operable by a pressurized fluid such as water, oil and the like, the cylinder being fitted with end caps, one or both of which mounts a pilot valve body having a bore therein containing a spool valve for selectively controlling flow paths between a plurality of fluid flow connection ports, the spool being spring urged to one operating position, and mechanically actuated to another operating position by means of a cam within the cylinder and which is supported for movement with the piston and arranged to engage a roller carried by the spool valve. One end of the pilot valve bore communicates directly with the cylinder interior so that the moving valve parts and cam are totally enclosed and lubricated by the motivating fluid of the actuator. A passageway through the spool valve applies cylinder fluid pressure against opposite ends of the spool so as to provide balanced operation thereof at all times.

Patented Sept. 29, 1970

3,530,896

MARVIN E. WHITEMAN JR.
INVENTOR.
WHANN & McMANIGAL
Attorneys for Applicant
BY 3,530,896

1

HYDRAULIC POWER ACTUATOR AND PILOT VALVE UNIT ASSEMBLY

BACKGROUND OF THE INVENTION

The invention relates to a hydraulic power actuator which is combined with a pilot valve to provide a unit assembly for controlling fluid control circuits in timed relation to the operation of the power actuator.

Power actuator unit assemblies such as conceived in the present invention are susceptible of general use in any hydraulic control system where it is desired to cycle the operation of a hydraulic power actuator for a particular device with the operation of a hydraulic power actuator on another device. As exemplary of such an application, the invention is especially useful in connection with concrete pumping apparatus such as illustrated in U.S. Letters Pat. No. 3,327,634, wherein the power actuators of concrete pumping instrumentalities are operated in timed cyclic relation with respect to gating valves and other devices of the system. As it will be noted from this patent, the conventional procedure was to utilize a separate pilot valve unit provided with an actuating member adapted to be motivated by means of a cam carried by or movable with a part of the actuator unit such as the externally projecting part of the power delivery rod or element.

The pilot valve unit and associated cam, as heretofore utilized, were more or less openly exposed with respect to at least a portion of their moving parts. These exposed moving parts were easily susceptible of contamination and lacked proper provision for proper protection against the elements, or for lubricating internal parts. As a result, contamination, lack of lubrication and other factors inherent in the conventional arrangements could easily function improperly and cause a malfunction in the cyclic operation of the system devices. Malfunctions manifestly in concrete pumping systems and other batching systems might become exceedingly costly.

The above noted problem as well as others inherent in the presently known conventional arrangements have to a great extent been eliminated by the herein described invention by providing a unitized assembly wherein the cycling pilot control valve is intimately associated with the power actuator in order to provide an integrated unit assembly, wherein the operatively associated moving parts of the actuator and pilot valve will be entirely enclosed, and in which the pilot valve means will be lubricated by the pressurized fluid medium utilized for motivating the actuator.

SUMMARY OF THE INVENTION

The present invention relates generally to hydraulic power actuators, and is more particularly concerned with a power actuator unit having a "built-in" pilot valve which is controlled directly in response to the operation of the actuator.

In its broad concept, the present invention seeks to provide a power actuator unit, susceptible of general application, in which the actuator and a cycling pilot valve operable in timed relation to the actuator are combined so as to provide a combined unitized mechanism. The accomplishment of this purpose is obtained by constructing the pilot valve as a part of an end cap of the actuator cylinder, with the internal parts of the valve being arranged for direct actuation by a cam of the actuator and so that the motivating fluid of the actuator will also continuously lubricate the valve parts.

Having in mind the broad concept of the present invention, it is one object to provide a hydraulic power actuator and pilot valve as a unitized assembly wherein the pilot valve parts and its actuating means are entirely enclosed, and will be continuously lubricated by the motivating fluid medium for the actuator.

A further object is to provide a hydraulic actuator unit according to the foregoing object wherein the pilot valve is incorporated as a part of an end cap of the cylinder of the power actuator, the end cap having a valve cavity in communication with the interior of the cylinder and providing a space in which the coacting elements of the valve and actuator may operate,

2 and in which the valve means are balanced with respect to the pressure actuating fluid of the actuator.

Another object of the invention is to provide a valve structure as a part of a cylinder end cap structure which is so designed as to permit a valve to be positioned at one end of the cylinder or to permit valves being positioned at opposite ends of the cylinder where it is desired to have multiple valves operating in timed relation to the operating cycle of the power actuator.

Still another object of the invention is to provide a pilot valve structure in the form of an end cap for use with hydraulically operated actuators, and which will permit the end cap being produced as a separate unit for adapting a conventional power actuator unit for cyclic operation with other actuator units.

The foregoing and other objects, features and advantages of the invention will be presented in the following part of the specification, wherein detailed description is for the purpose of fully disclosing the invention without placing limitations thereon.

BRIEF DESCRIPTION OF THE DRAWINGS

Referring to the accompanying drawings, which are for illustrative purposes only.

DESCRIPTION OF THE PREFERRED EMBODIMENT

Figure 1:
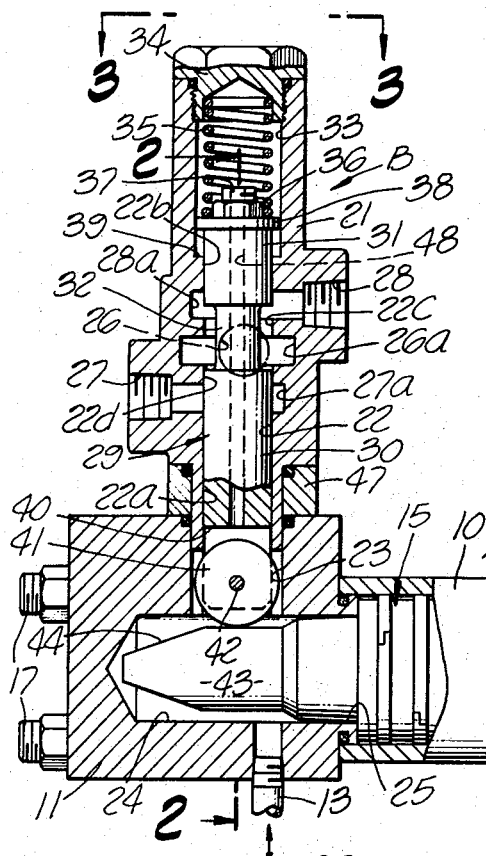
FIG. 1 is a fragmentary side elevational view of a hydraulic power actuator and pilot valve unit assembly embodying the features of the present invention, portions being shown in section to show the cooperative relationship of essential elements.
Figure 2:
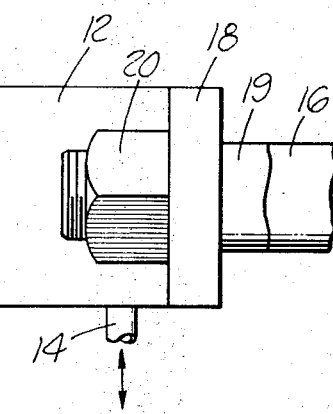
FIG. 2 is a fragmentary end view including a section taken substantially on line 2–2 of FIG. 1.
Figure 2:
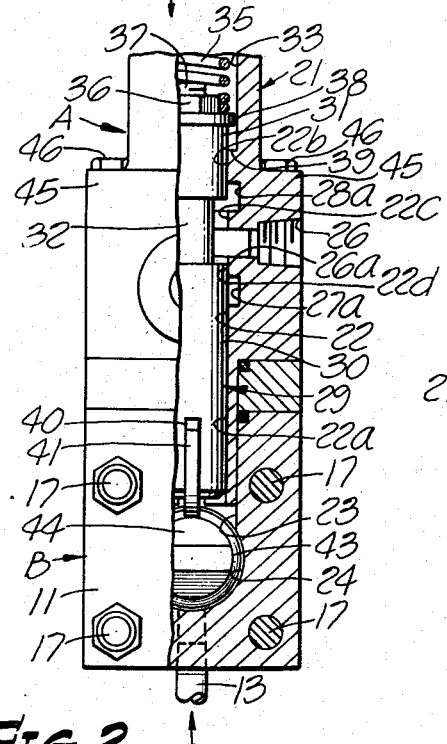

Referring more specifically to the drawings, the present invention for illustrative purposes is shown in FIG. 1 as comprising a hydraulic power actuator A and pilot valve B which have been combined according to the present invention into a unit assembly for use in systems utilizing a plurality of fluid actuators, and in which it is desired to cycle the operation of control for certain of the devices in dependence upon the operation of one or more of the hydraulic actuators.

The hydraulic power actuator A is of conventional construction in so far as it comprises a cylinder 10 having its ends mounted in an end cap structure 11 at one end and a power delivery end cap structure 12 at its other end. These end caps are provided with suitable ports adapted for connection with a supply conduit 13 in the case of end cap 11, and conduit 14 in the case of end cap 12. By means of these conduits, suitable actuator fluid pressure may be alternately admitted and exhausted to the cylinder for actuating an operatively associated piston 15 therein for reciprocable movement, this piston being connected with a power delivery piston rod 16 which is carried through a suitable bushing in the end cap 12 where it is provided with appropriate coupling means (not shown) for connecting to the device to be operated thereby. The rods 17 interconnect the end caps and retain them in assembled relation with the cylinder to provide the actuator assembly.

As will be seen, the power delivery end cap may be provided with a suitable attaching flange or flanges 18 for mounting the actuator assembly, as by one or more securing bolts 19 and associated nuts 20. As thus arranged, the end cap 11 will be outwardly disposed and is shown in this case as having the pilot valve B mounted thereon. In this position, the pilot valve will be actuated when the piston rod reaches the end of its retracted stroke. It will be appreciated, however, that a similar pilot valve might also be mounted at the power delivery end cap 12 so as to provide cycling control at the end of the extended position of the power delivery piston rod. Should it be required that the system be so operated, a pilot valve may be positioned at both ends of the cylinder. It is believed that the operation of the pilot valve will be fully comprehended from a description of a valve as mounted in one position only, for example, upon the end cap structure 11.

As shown in FIG. 1, the pilot valve comprises a hollow valve body 21 of generally elongate construction having an internal axially extending bore 22 which is in communication at its inner end with a bore passage 23 formed in the end cap wall and having communication with an internal cavity 24, this cavity being axially aligned with the cylinder and having a communicating port opening 25 into the adjacent end of the cylinder.

Between the opposite ends of the valve body 21, the body is enlarged and internally constructed to provide spaced cavities which are in communication with corresponding port openings arranged for the connection of fluid control conduits for the flow of pressurized fluid under the control of the pilot valve. While any conventional arrangement may be provided to control any practical number of flow lines, in the present instance provision is made for the connection of three conduits by providing connection ports 26, 27 and 28 which communicate with a central cavity 26a, an inner cavity 27a and an outer cavity 28a, each of these cavities extending around the outer periphery of the bore 22.

Reciprocably mounted within the bore 22 is a spool valve 29, this valve having end portions 30 and 31 respectively in axially spaced apart relation and being interconnected by a neck portion 32 of reduced diameter. The end portions 30 and 31 are respectively slidably movable in bore portions 22a and 22b. The bore portion 22a extends below the cavity 27a, while the bore portion 22b extends above the cavity 28a. The cavity 28a is separated from the cavity 26a by a wall portion containing a bore passage 22c, while cavity 27a is separated from the cavity 26a by a wall portion containing a bore portion 22d. With a valve spool as thus arranged, it is readily apparent that the valve can be moved to an upper position wherein the connection ports 26 and 28 will be connected while the port 26 will be disconnected with respect to the port 27. On the other hand, the valve spool is displaceable to a lower position in which the port 26 will connect with the port 27, but will be disconnected with respect to the port 28. Selectivity of flow is thus controlled between the ports.

At the upper end of the valve body 21, as seen in FIG. 1, the bore 22 communicates with a slightly enlarged bore extension 33 which is closed at its uppermost end by a screw plug 34. The bore extension 33 houses a compression spring 35, one end of this spring being in engagement with the screw plug, while the opposite end is engaged over a retaining nut 36 having threaded engagement with an end stud 37 formed on this end of the valve spool, the nut being used to retain a stop washer 38 for limiting the downward movement of the spool under the urging of the spring. The stop washer is arranged to abut an annular shoulder 39 at the bottom of the bore extension 33.

The lowermost end of the spool valve is formed with a transversely extending end slot 40 within which a roller 41 is supported for rotation upon an axle pin 42.

Figure 3:
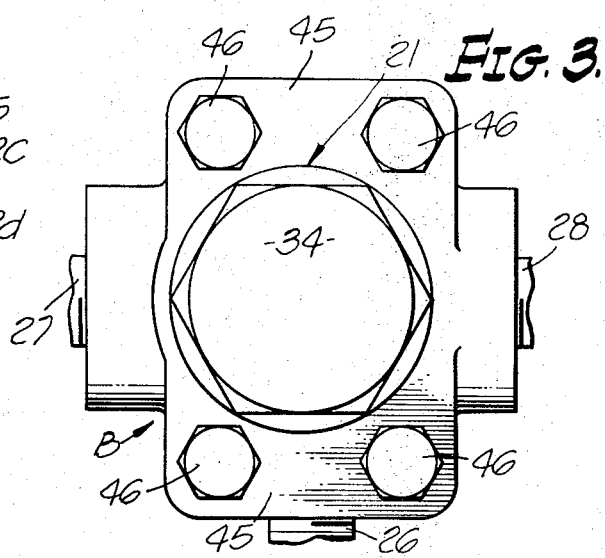
FIG. 3 is an enlarged fragmentary top view as seen substantially from line 3–3 of FIG. 1.

In the raised position of the spool valve, as shown in FIG. 1, it will be noted that an edge of the roller extends into the cavity 24, and that when the spool valve is urged by the spring 35 to the limit of its movement, the roller will be in a position within the cavity 24 wherein it will be in the path of movement of a cam member 43 carried by and axially in alignment with the piston 15. When the piston is moved to the right, as shown in FIG. 1, the cam member will be withdrawn from the cavity 24, and the spool valve is then free to be urged downwardly to one of its control positions. However, when the piston is moved in an opposite direction so that the cam member re-enters the cavity 24, a cam surface thereon, as indicated at 44, will engage the roller and move it to its other control position. As thus arranged, it will be clear that the actuation of the valve will be synchronized with movements of the piston of the actuator. As previously mentioned, in some installations it may be desirable to also actuate a pilot valve at the end of the power delivery stroke of the actuator. In such case the pilot valve assembly would be incorporated as a part of the power delivery end cap 12. The actual construction of the pilot valve may vary, but has been disclosed herein as comprising the separate valve body 21 which is secured to the associated end cap by incorporating in the structure suitable mounting flanges 45–45, as shown in FIG. 3, anchor bolts 46 extending through these flanges into threaded engagement with threaded bores provided in the end cap. The axial position of the valve body may be varied to meet different installation requirements by providing a suitable spacer member 47.

An important feature of the present invention is that the actuator fluid also serves as a lubricant for the pilot valve parts. This fluid being pressurized acts on the lowermost end of the spool valve, and would tend to force the valve against the pressure of the spring 35 and thus produce faulty operation. This is prevented by providing an equalizing pressure of fluid at the opposite end of the spool valve through a passageway which connects the source of fluid pressure with the bore extension 33. For convenience, this is accomplished by providing an axial bore passage 48 which interconnects the spaces at the opposite ends of the valve spool and subjects end areas to fluid pressure which balances the valve spool so that the fluid pressure does not interfere with the spool operation. The bore passage 48 also serves as a bleed for the bore extension 33 for fluid which could otherwise be entrapped therein.

From the foregoing description and drawings, it will be clearly evident that the delineated objects and features of the invention will be accomplished.

Various modifications may suggest themselves to those skilled in the art without departing from the spirit of my invention, and, hence, I do not wish to be restricted to the specific form shown or uses mentioned, except to the extent indicated in the appended claims.

I claim:

1. Hydraulic power actuator means, comprising:
    a. a main power actuator cylinder and fluid pressure operable reciprocable piston therein connected with a power delivery element;
    b. a pilot valve unit including a valve body having an elongate bore therein communicating with an inlet port and an outlet port;
    c. valve means extending into said bore and being movable to positions respectively connecting and disconnecting a flow path between said ports;
    d. means normally urging said valve means to one of said positions; and
    e. means including a part movable within said main power actuator cylinder for actuating said valve means to the other of said positions in response to the movement of said main power piston to a predetermined position, whereby the pilot valve means operation is controlled by and in timed relation to the operation of the main power actuator.

2. Power actuator means according to claim 1, wherein said bore has one end in communication with the interior of said main power actuator cylinder and the piston actuating fluid pressure therein, and said part comprises a cam member.

3. Power actuator means according to claim 2, wherein said valve means comprises a valve spool axially reciprocable in said bore; and a flow passage connects with the opposite ends of the spool for applying said piston actuating fluid pressure against balancing areas at the opposite ends of said spool and bleeding fluid from the outer of said balancing areas during movement of the valve means responsive to the piston movement.

4. Power actuator means according to claim 3, wherein said flow passage extends between said areas through said spool.

5. Power actuator means according to claim 1, wherein the valve means in the position disconnecting the flow path between said ports, connects one of said ports into a flow path including a third port.

6. A hydraulic power actuator unit assembly comprising:

a. a cylinder and fluid pressure operable reciprocable piston therein connected with a power delivery element;
b. an end cap at one end of said cylinder;
c. a valve body carried by said end cap, said body having a plurality of fluid flow connection ports;
d. valve means in said body supported for movement to different positions for controlling fluid flow between said ports; and
e. means responsive to piston movement for moving said valve means at a predetermined position of said piston.

7. A power actuator unit assembly according to claim 6, wherein the valve means includes a valve spool member reciprocable within a valve bore having one end in communication with the interior of said cylinder.

8. A power actuator unit assembly according to claim 7, including a flow passage for subjecting opposite end areas of the valve spool to the actuating fluid pressure in said cylinder, whereby the valve spool is axially balanced.

9. A power actuator according to claim 8, wherein the flow passage extends through the valve spool between said end areas.

10. A power actuator unit assembly according to claim 7, wherein said valve spool is axially spring urged in one direction and said means for moving said valve means is operative to axially move said spool in an opposite direction.

11. A power actuator unit assembly according to claim 7, wherein the valve bore communicates with the cylinder through a cavity in said end cap; the valve spool has an end extending into said cavity; and the means responsive to piston movement includes a cam member engageable with the spool end in said cavity.

12. A power actuator unit assembly according to claim 11, wherein the valve spool end carries a roller positioned in the path of travel of said cam member.

13. The combination with a fluid operable power actuator having a cylinder and associated piston, of a pilot valve assembly for mounting on said cylinder, comprising:
a. an end cap member adapted for sealed mounting at one end of the actuator cylinder, said member having a cavity open at one side adapted for communication with the associated cylinder interior;
b. a valve body mounted at one side of said end cap, said body having an elongate bore with one end in communication with said cavity, said bore having a plurality of flow connection ports;
c. a valve spool reciprocable in said bore and adapted to be moved in a direction away from said cavity in response to movement of the actuator piston to control fluid flow between said flow connection ports, said spool having an end portion extending into said cavity; and
d. a spring normally urging the spool valve in the direction of said cavity.

14. The combination according to claim 13, including a member rotatably supported on said valve end portion.

15. The combination according to claim 13, wherein the valve spool has an axial bleed and pressure equalizing passage extending between its opposite end faces.